(12) United States Patent
Kwon

(10) Patent No.: US 9,919,604 B2
(45) Date of Patent: Mar. 20, 2018

(54) POWER NET SYSTEM OF FUEL CELL VEHICLE AND METHOD FOR CONTROLLING THE SAME

(71) Applicant: Hyundai Motor Company, Seoul (KR)

(72) Inventor: Sang Uk Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 14/963,865

(22) Filed: Dec. 9, 2015

(65) Prior Publication Data

US 2016/0375778 A1   Dec. 29, 2016

(30) Foreign Application Priority Data

Jun. 24, 2015   (KR) .................. 10-2015-0090040

(51) Int. Cl.
| | |
|---|---|
| *B60L 3/00* | (2006.01) |
| *B60L 7/08* | (2006.01) |
| *B60L 7/18* | (2006.01) |
| *B60L 11/18* | (2006.01) |
| *H02H 7/26* | (2006.01) |

(52) U.S. Cl.
CPC .......... *B60L 3/0046* (2013.01); *B60L 3/0069* (2013.01); *B60L 7/08* (2013.01); *B60L 7/18* (2013.01); *B60L 11/1881* (2013.01); *H02H 7/268* (2013.01); *Y02T 10/7258* (2013.01)

(58) Field of Classification Search
CPC .. B60L 11/1881; H02H 7/268; Y02T 10/7258
See application file for complete search history.

(56) References Cited

FOREIGN PATENT DOCUMENTS

| | | | |
|---|---|---|---|
| JP | 2009-165243 A | 7/2009 |
| JP | 2010-176864 A | 8/2010 |
| JP | 2013-187941 A | 9/2013 |
| KR | 2008-0032909 A | 4/2008 |
| KR | 10-2008-0054008 A | 6/2008 |
| KR | 2010-0060478 | 6/2010 |
| KR | 10-2013-027275 A | 2/2013 |

*Primary Examiner* — Robert Deberadinis
(74) *Attorney, Agent, or Firm* — Mintz Levin Cohn Ferris Glovsky and Popeo, P.C.; Peter F. Corless

(57) ABSTRACT

A power net system of a fuel cell vehicle is provided. The power net system includes a fuel cell and a first switching unit that is configured to form and block an electrical connection between an output terminal of the fuel cell and a main bus. A load device diverges and is connected between the output terminal and the first switching unit. A reverse current blocking unit is disposed between the output terminal of the fuel cell and a node from which the load device diverges and is configured to block a current flow to the output terminal of the fuel cell. A second switching unit is configured to form and block an electrical connection between the output terminal of the fuel cell and the load device. A controller operates the first and second switching units to form the electrical connection between the main bus and the load device.

20 Claims, 4 Drawing Sheets

_US 9,919,604 B2_

POWER NET SYSTEM OF FUEL CELL VEHICLE AND METHOD FOR CONTROLLING THE SAME

CROSS REFERENCE TO RELATED APPLICATION

The present application claims priority to Korean Patent Application No. 10-2015-0090040, filed Jun. 24, 2015, the entire contents of which is incorporated herein for all purposes by this reference.

BACKGROUND

Field of the Disclosure

The present disclosure relates to a power net system of a fuel cell vehicle and a method for controlling the same, and more particularly, to a power net system of a fuel cell vehicle, capable of removing a voltage remaining in a main bus of the power net as well as a voltage of a fuel cell stack during a dangerous situation such as collision, and preventing a risk of exposure to a high voltage, and a method for controlling the same.

Description of the Related Art

A fuel cell system which is applied to a hydrogen fuel cell vehicle as one of environment-friendly vehicles includes a fuel cell stack configured to generate electrical energy from an electrochemical reaction of reaction gas; a hydrogen supply device configured to supply hydrogen as fuel to the fuel cell stack; an air supply device configured to supply air containing oxygen to the fuel cell stack, the oxygen serving as an oxidizer required for an electrochemical reaction; and a heat and water management system configured to adjust the operation temperature of the fuel cell stack to an optimal temperature by discharging heat as a by-product of the electrochemical reaction of the fuel cell stack to the exterior, and perform a water management function.

A fuel cell load device for decreasing and removing the voltage of the fuel cell stack is connected to the fuel cell stack to remove oxygen inside the fuel cell stack while and after the start of the fuel cell vehicle is stopped. The oxygen introduced to the fuel cell stack is removed with remaining hydrogen of the anode, while the current is consumed by the fuel cell load device. When the anode is out of hydrogen (e.g., no hydrogen remains), oxygen cannot be consumed. Thus, to prevent such a situation, the wakeup technology is used to periodically supply hydrogen to the anode. In other words, the fuel cell vehicle requires a separate post process for decreasing the voltage of the fuel cell stack by removing remaining air inside the fuel cell stack after start off, unlike the internal-combustion engine.

To prevent the deterioration of the fuel cell stack and a risk of exposure to a high voltage. When a voltage is formed when oxygen exists in the anode, carbon corrosion occurs at the cathode. Thus, the fuel cell vehicle requires a process of removing oxygen inside the fuel cell stack, preventing an additional oxygen flow, and removing oxygen which is introduced. When a dangerous situation such as collision occurs, the conventional fuel cell vehicle is forced to use the fuel cell load device to decrease the voltage of the fuel cell stack, thereby preventing a risk of exposure to a high voltage.

However, the conventional fuel cell vehicle simply decreases the voltage of the fuel cell stack, and a high voltage remains at a main bus of a power net connected to the fuel cell stack and another high-voltage load. Thus, a risk for exposure to a high voltage still exists. In particular, when the conventional fuel cell vehicle is applied to a fuel cell hybrid vehicle having a main bus connected to a high-voltage battery, a risk of exposure to a high voltage remaining in the main bus may increase.

The foregoing is intended merely to aid in the understanding of the background of the present disclosure, and is not intended to mean that the present disclosure falls within the purview of the related art that is already known to those skilled in the art.

SUMMARY

The present disclosure provides a power net system of a fuel cell vehicle, capable of preventing a risk of exposure to a high voltage by removing a voltage remaining in a main bus when a specific event occurs at which the voltage of the main bus of the fuel cell is to be removed, and a method for controlling the same.

According to one aspect, a power net system of a fuel cell vehicle may include: a fuel cell; a first switching unit configured to form and block an electrical connection between an output terminal of the fuel cell and a main bus; a load device diverging and connected between the output terminal of the fuel cell and the first switching unit; a reverse current blocking unit disposed between the output terminal of the fuel cell and a node from which the load device diverges, and configured to block a current flow to the output terminal of the fuel cell; a second switching unit configured to form and block an electrical connection between the output terminal of the fuel cell and the load device; and a controller configured to operate the first and second switching units to form the electrical connection between the main bus and the load device to cause power of the main bus to be consumed by the load device, when a preset specific event occurs (e.g., a vehicle collision).

When a preset dangerous event occurs (e.g., the vehicle collision), the controller may be configured to operate the first and second switching units to be shorted, until the voltage of the main bus decreases to be less than a preset voltage. When a preset dangerous event occurs, the controller may be configured to operate the first switching unit to be opened and operate the second switching unit to be shorted, until the voltage of the output terminal of the fuel cell decreases to be than a preset voltage. After the voltage of the output terminal of the fuel cell decreases to be less than the preset voltage, the controller may be configured to the first and second switching units to be shorted, until the voltage of the main bus decreases to be less than the preset voltage.

The power net system may further include a high-voltage battery unit connected in parallel to the fuel cell via the main bus. When a preset dangerous event occurs, the controller may be configured to block the electrical connection between the high-voltage battery unit and the main bus, and operate the first and second switching units to be shorted, until the voltage of the main bus decreases to be less than a preset voltage.

When the preset dangerous event occurs, the controller may be configured to block the electrical connection between the high-voltage battery unit and the main bus, and operate the first switching unit to be opened and operate the second switching unit to be shorted, until the voltage of the output terminal of the fuel cell decreases to be less than a preset voltage. After the voltage of the output terminal of the fuel cell decreases to be less than the preset voltage, the controller may be configured to operate the first and second switching units to be shorted, until the voltage of the main bus decreases to be less than the preset voltage. When the preset dangerous event occurs, the controller may be configured to block the supply of hydrogen and oxygen to the fuel cell, before operating the first and second switching units.

The power net system may further include a driving motor unit connected to the main bus. When regenerative braking power is generated by the driving motor unit, the controller may be configured to operate the first and second switching units to be shorted, to cause the regenerative braking power to be consumed by the load device. When regenerative braking power is generated by the driving motor unit, the controller may be configured to detect whether the high-voltage battery unit may be charged, and when the high-voltage battery unit may not be charged, the controller may be configured to operate the first and second switching units to be shorted, to cause the regenerative braking power to be consumed by the load device. The controller may be configured to adjust an output voltage of a high-voltage converter in the high-voltage battery unit to adjust the voltage of the main bus to be a value that corresponds to an open state voltage of the fuel cell.

According to another aspect, a method for controlling a power net system of a fuel cell vehicle is provided. When a preset specific event occurs, a controller may be configured to operate a first switching unit to form and block an electrical connection between an output terminal of a fuel cell and a main bus and a second switching unit to form and block an electrical connection between the output terminal of the fuel cell and a load device diverging and connected between the output terminal of the fuel cell and the first switching unit, and form electrical connection between the main bus and the load device to cause power of the main bus to be consumed by the load device.

The method may include: operating, by the controller, the first and second switching units to be shorted, when a preset dangerous event occurs; comparing, by the controller, the voltage of the main bus to a preset voltage; and operating, by the controller, the first and second switching units to be opened, when the voltage of the main bus decreases to be less than the preset voltage.

The method may include: operating, by the controller, the first switching unit to be opened and operating the second switching unit to be shorted, when a preset dangerous event occurs; comparing, by the controller, the voltage of the output terminal of the fuel cell to a preset first voltage; operating, by the controller, the first and second switching units to be shorted when the voltage of the output terminal of the fuel cell decreases to be less than the first voltage; comparing, by the controller, the voltage of the main bus to a preset second voltage; and operating, by the controller, the first and second switching units to be opened, when the voltage of the main bus decreases to be less than the second voltage.

The method may include: blocking, by the controller, the electrical connection between the main bus and a high-voltage battery unit connected in parallel to the fuel cell via the main bus and operating the first and second switching units to be shorted, when a preset dangerous event occurs; comparing, by the controller, the voltage of the main bus to a preset voltage; and operating, by the controller, the first and second switching units to be opened when the voltage of the main bus decreases to be less than the preset voltage.

The method may include: blocking, by the controller, the electrical connection between the main bus and a high-voltage battery unit connected in parallel to the fuel cell via the main bus, and operating the first switching unit to be opened and operating the second switching unit to be shorted, when a preset dangerous event occurs; comparing, by the controller, the voltage of the output terminal of the fuel cell to a preset first voltage; operating, by the controller, the first and second switching units to be shorted, when the voltage of the output terminal of the fuel cell decreases to be less than the first voltage; comparing, by the controller, the voltage of the main bus to a preset second voltage; and operating, by the controller, the first and second switching units to be opened, when the voltage of the main bus decreases to be less than the second voltage.

The method may further include blocking, by the controller, the supply of hydrogen and oxygen to the fuel cell before the operating the first and second switching units to be shorted, when the preset dangerous event occurs. When regenerative braking power is generated by a driving motor unit connected to the main bus, the controller may be configured to operate the first and second switching units to be shorted, to cause the regenerative braking power to be consumed by the load device.

The method may further include: detecting, by the controller, whether a high-voltage battery unit connected in parallel to the fuel cell via the main bus may be charged, when regenerative braking power is generated by a driving motor unit connected to the main bus; and operating, by the controller, the first and second switching units to be shorted, to cause the regenerative braking power to be consumed by the load device, when the high-voltage battery unit may not be charged. Further, the controller may be configured to adjust an output voltage of a high-voltage converter in the high-voltage battery unit to adjust the voltage of the main bus to have a value that corresponds to an open state voltage of the fuel cell.

The power net system of the fuel cell vehicle and the method for controlling the same may rapidly and efficiently remove a high voltage remaining in the main bus connected to a high-voltage load through the load device, thereby blocking a risk of exposure to the high voltage. Furthermore, when power generated by regenerative braking may not be stored in the high-voltage battery, the power net system of the fuel cell vehicle and the method for controlling the same may consume the regenerative braking power introduced to the main bus using the load device. Thus, the time and distance at which regenerative braking can be applied may be increased to contribute to safe driving.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a power net system of a fuel cell vehicle and a method for controlling the same according to various exemplary embodiments of the present disclosure will be described with reference to the attached drawings.

Figure 1:
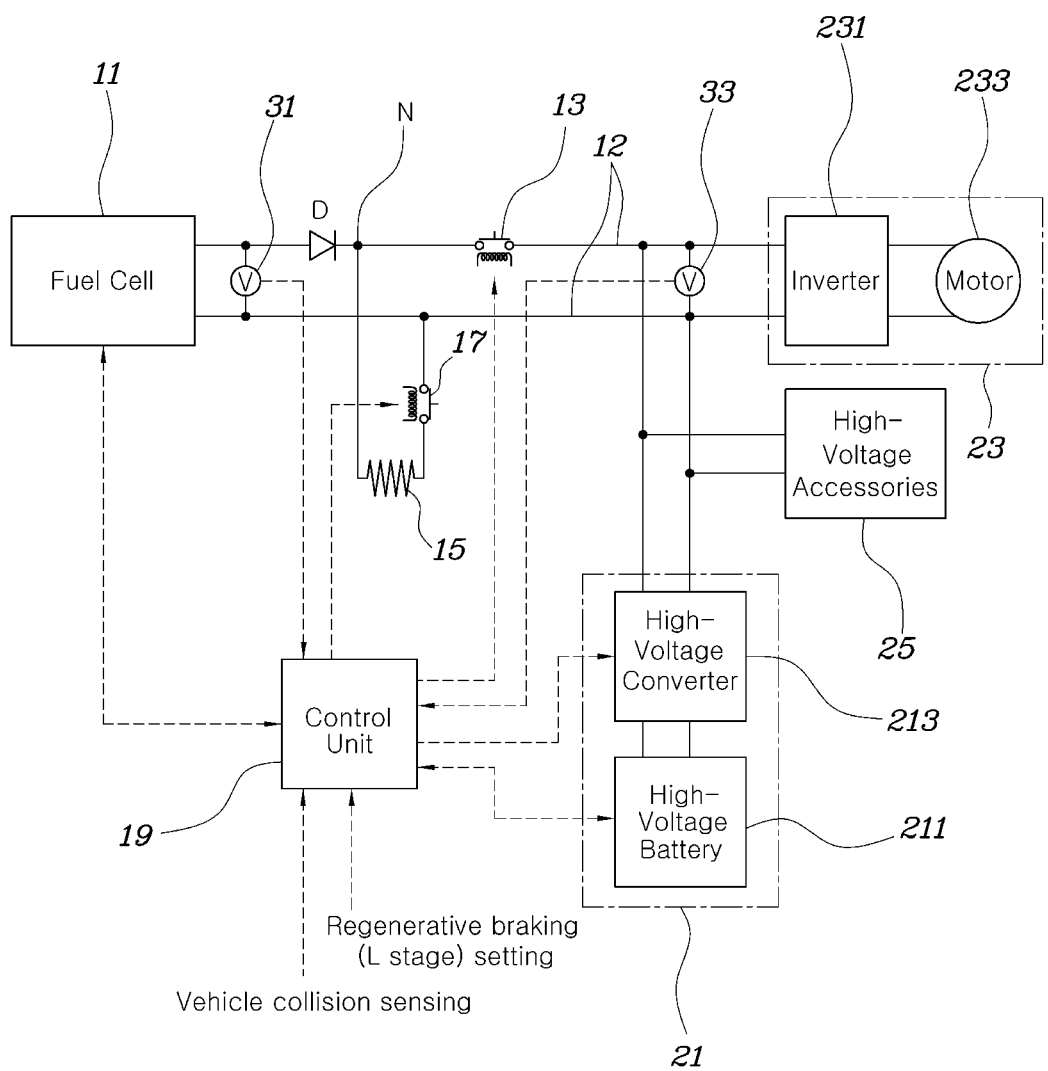
FIG. 1 is a configuration diagram illustrating a power net system of a fuel cell vehicle according to an exemplary embodiment of the present disclosure.

FIG. 1 is a configuration diagram illustrating a power net system of a fuel cell vehicle according to an exemplary embodiment of the present disclosure. Referring to FIG. 1, the power net system of the fuel cell vehicle may include a fuel cell 11; a first switching unit 13 configured to form and block an electrical connection between an output terminal of the fuel cell 11 and a main bus 12; a load device 15 diverging and connected between the output terminal of the fuel cell 11 and the first switching unit 13; a second switching unit 17 configured to form and block an electrical connection between the output terminal of the fuel cell 11 and the load device 15; and a controller 19 configured to operate the first and second switching units 13 and 17 to form/block the electrical connection between the main bus 12 and the load device 15.

The power net system according to the exemplary embodiment of the present disclosure may include a reverse current blocking unit D between the output terminal of the fuel cell 11 and the first switching unit 13. More specifically, the reverse current blocking unit D may be disposed between the output terminal of the fuel cell 11 and a node N from which the load device 15 diverges. The reverse current blocking unit D may be configured to block a current flow to the output terminal of the fuel cell 11 from the main bus 12, when the first switching unit 13 is shorted. The reverse current blocking unit D may include a diode D of which the anode and cathode may be connected to the output terminal of the fuel cell 11 and the first switching unit 13, respectively. In the exemplary embodiment of the present disclosure, as the reverse current blocking unit D is disposed between the output terminal of the fuel cell 11 and the node N from which the load device 15 diverges, a high-voltage battery unit 21 and the load device 15 may form electrical connection based on the short circuit state/open state of the switching units 13 and 17. The electrical connection between the high-voltage battery unit 21 and the load device 15 will be described below in more detail.

The power net system according to the exemplary embodiment of the present disclosure may further include the high-voltage battery unit 21 connected in parallel to the fuel cell 11 via the main bus 12. The high-voltage battery unit 21 may operate as an auxiliary power supply of the fuel cell vehicle using the fuel cell 11 as a main power supply. The high-voltage battery unit 21 may include a high-voltage battery 211 configured to store power and a two-way high-voltage converter 213 configured to convert an output of the high-voltage battery 211 into a voltage and provide the voltage to the main bus 12 or convert power input from the main bus 12 into a voltage and provide the voltage to the high-voltage battery 211 to charge the high-voltage battery 211.

The power net system according to the exemplary embodiment of the present disclosure may further include a driving motor unit 23 connected to the main bus 12. The driving motor unit 23 may be configured to generate power using the voltage provided from the fuel cell 11 operating as a main power supply or the high-voltage battery unit 21 operating as an auxiliary power supply. The driving motor unit 23 may include an inverter 231 configured to convert direct current (DC) power input from the main bus 12 into alternating current (AC) power and a driving motor 233 driven by the AC power provided from the inverter 231. The driving motor unit 23 may be configured to generate power when regenerative braking is performed, and use the generated power to charge the high-voltage battery 211. In particular, when a transmission using an engine brake is set to an L stage (e.g., a low stage or a first gear), the driving motor unit 23 may be configured to generate power to be used for charging the high-voltage battery 211 while generating a braking force through the regenerative braking of the driving motor.

FIG. 1 illustrates that the switching units 13 and 17 are implemented with relays for shorting/opening connection between contacts through the electromagnetic induction method. However, the switching units 13 and 17 may be replaced with various types of controllable switching units which are applied to the art. Reference numeral 25 represents a variety of high-voltage accessories which may be connected to the main bus 12 and use a high voltage, and reference numerals 31 and 33 represent voltage sensors configured to sense the voltage of the output terminal of the fuel cell 11 and the voltage of the main bus 12.

When a preset specific event occurs (e.g., a vehicle collision) in the power net system of the fuel cell vehicle according to the exemplary embodiment of the present disclosure, the controller 19 may be configured to operate the first and second switching units 13 and 17 to cause the power remaining in the main bus 12 to be consumed by the load device 15. In the conventional fuel cell vehicle, the load device 15 is used to consume power remaining in the output terminal of the fuel cell 11, to decrease the voltage of the output terminal of the fuel cell 11. In the present exemplary embodiment, however, the load device 15 may be used to remove remaining power of the main bus 12 when a specific event occurs. The specific event may indicate an event which is preset to consume the power of the main bus 12. For example, the specific event may include an event such as a collision accident of the fuel cell vehicle or regenerative braking set by a driver. During the regenerative braking, the transmission may be shifted to the L stage.

Accordingly, the power net system according to the exemplary embodiment of the present disclosure may rapidly and efficiently remove a high voltage remaining in the main bus 12 through the load device 15, thereby blocking a risk of exposure to a high voltage. Furthermore, when the high-voltage battery unit 21 may not be charged with the power generated through regenerative braking, the power net system may consume the power introduced to the main bus 12 using the load device 15, thereby increasing the distance to which regenerative braking can be applied.

Hereafter, a method for controlling the power net system of the fuel cell vehicle according to the exemplary embodiment of the present disclosure will be described in more detail.

Figure 2:
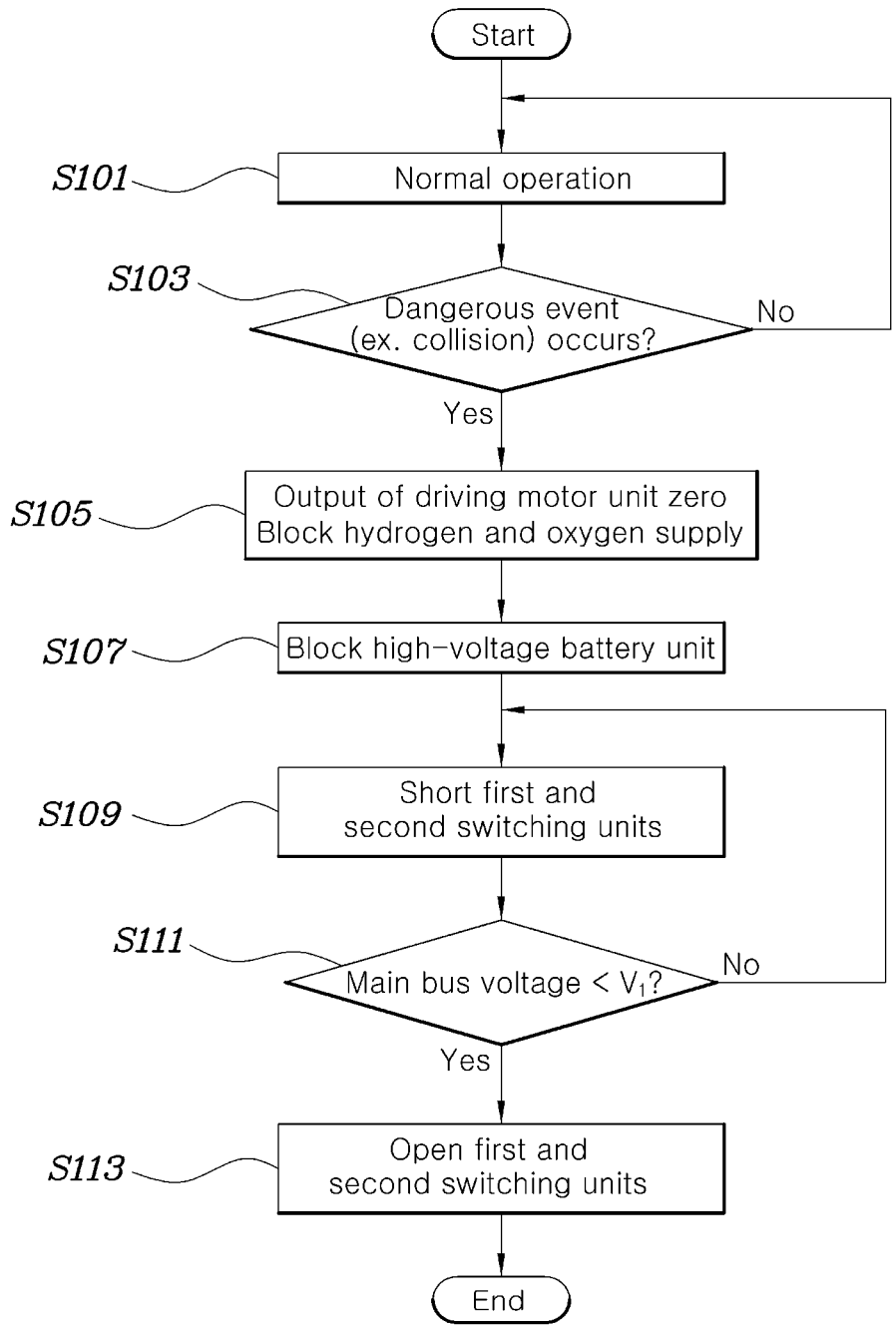
FIGS. 2 to 4 are flowcharts illustrating various methods for controlling a power net system of a fuel cell vehicle according to an exemplary embodiment of the present disclosure.

FIG. 2 is a flowchart illustrating an example of a method for controlling a power net system of a fuel cell vehicle according to an exemplary embodiment of the present disclosure. The control method illustrated in FIG. 2 may be performed when a dangerous event such as a collision accident occurs in the fuel cell vehicle. When a dangerous event such as a collision accident occurs, the main bus 12 may be exposed or shorted to another part of the vehicle, external equipment, or the human body. Such a dangerous event may be sensed by various sensors (not illustrated) installed within the vehicle. When information sensed by the sensors is input to the controller 19, the controller 19 may be configured to verify whether a dangerous event has occurred.

Referring to FIG. 2, when a preset dangerous event occurs at step S103 while the fuel cell vehicle having the power net system according to the exemplary embodiment of the present disclosure is operated normally (e.g., without failure or error) at step S101, the controller 19 may be configured to block hydrogen and oxygen supplied to the stack of the fuel cell 11, and stop the operation of the fuel cell 11 at step S105. At step S101, power output from the fuel cell 11 may be provided to the driving motor unit 23 through the main bus 12 when the first switching unit 13 is shorted, and the second switching unit 17 is opened. Furthermore, at step S105, the controller 19 may be configured to adjust the output of the driving motor 233 in the driving motor unit 23 to zero.

Then, the controller 19 may be configured to block the electrical connection between the high-voltage battery unit 21 and the main bus 12 at step S107. At step S107 of blocking the electrical connection between the high-voltage battery unit 21 and the main bus 12, the controller 19 may be configured to operate a relay (not illustrated) formed in the high-voltage battery 211 to block the connection between the high-voltage battery 211 and the high-voltage converter 213, or operate switching elements in the high-voltage converter 213 to electrically insulate the high-voltage battery 211 and the main bus 12 from each other. Both of the methods may be applied.

Then, the controller 19 may be configured to operate the first and second switching units 13 and 17 to be shorted at step S109. Through the control of step S109, the output terminal of the fuel cell 11 and the main bus 12 may be electrically connected to the load device 15. Through the electrical connection state, the remaining power of the output terminal of the fuel cell 11 and the remaining power of the main bus 12 may be simultaneously consumed by the load device 15, and the voltage of the output terminal of the fuel cell 11 and the voltage of the main bus 12 may be decreased.

Further, the controller 19 may be configured to compare the voltage of the main bus 12 to a preset voltage $V_1$, and determine whether the voltage of the main bus 12 is less than the preset voltage $V_1$, at step S111. At step S111, the controller 19 may be configured to receive the magnitude information of the voltage of the main bus 12 from the voltage sensor 33 configured to sense the voltage of the main bus 12, and compare the voltage of the main bus 12 to the preset voltage $V_1$. The voltage $V_1$ may be preset to a low voltage value at which safety may be secured even when the voltage of the main bus 12 is exposed to the human body or the like.

The process of operating the first and second switching units 13 and 17 to be shorted may be continuously maintained until the voltage of the main bus 12 decreases to be less than the preset voltage $V_1$. Then, when the voltage of the main bus 12 decreases to be less than the preset voltage $V_1$, the controller 19 may be configured to operate the first and second switching units 13 and 17 to be opened, thereby blocking the electrical connection between the fuel cell 11 and the main bus 12 and the electrical connection between the fuel cell 11 and the load device 15, at step S113. Accordingly, when a dangerous event such as collision occurs, the method for controlling the power net system of the fuel cell vehicle according to the exemplary embodiment of the present disclosure may electrically connect the fuel cell 11 and the main bus 12 to the load device 15 simultaneously, and rapidly decrease the voltage of the main bus 12 as well as the voltage of the output terminal of the fuel cell 11, thereby removing a risk caused by the exposure of the main bus 12.

Figure 3:
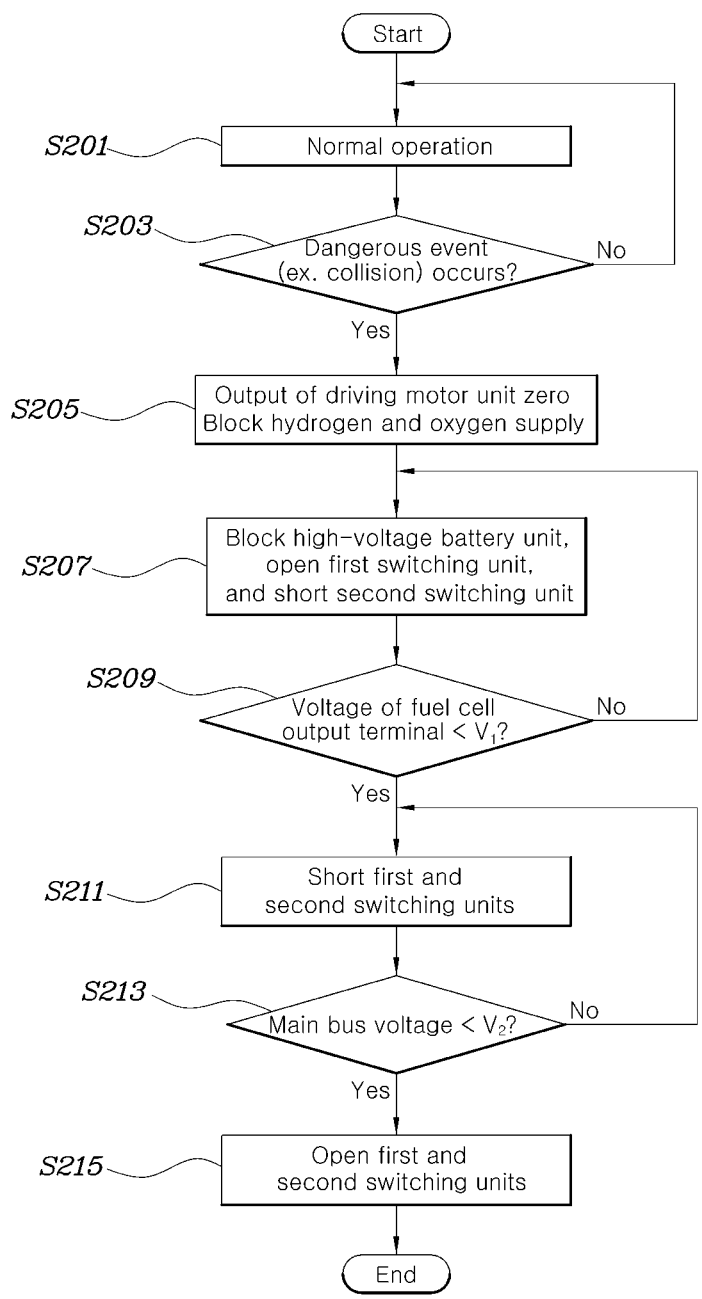

FIG. 3 is a flowchart illustrating another example of the method for controlling the power net system of the fuel cell vehicle according to the exemplary embodiment of the present disclosure. The control method illustrated in FIG. 3 may be performed when a dangerous event such as a collision accident occurs in the fuel cell vehicle, as in the control method illustrated in FIG. 2.

Referring to FIG. 3, steps S201 to S205 may be performed in substantially the same manner as the control method illustrated in FIG. 2. In other words, when a preset dangerous event occurs at step S203 while the fuel cell vehicle having the power net system according to the exemplary embodiment of the present disclosure is operated normally at step S201, the controller 19 may be configured to block hydrogen and oxygen supplied to the stack of the fuel cell 11, and stop the operation of the fuel cell 11 at step S205. At step S201, power output from the fuel cell 11 may be provided to the driving motor unit 23 through the main bus 12 when first switching unit 13 is shorted, and the second switching unit 17 is opened. Furthermore, at step S205, the controller 19 may be configured to adjust the output of the driving motor 233 in the driving motor unit 23 to zero.

Then, the controller 19 may be configured to operate the first switching unit 13 to be opened and operate the second switching unit 17 to be shorted, at step S207. Through the control of step S207, the output terminal of the fuel cell 11 may be electrically connected to the load device 15, and the electrical connection between the main bus 12 and the fuel cell 11 and the electrical connection between the main bus 12 and the load device 15 may be blocked. Through the electrical connection state, the remaining power of the output terminal of the fuel cell 11 may be consumed by the load device 15, and the voltage of the output terminal of the fuel cell 11 may be decreased. At step S207, the controller 19 may be configured to block the electrical connection between the high-voltage battery 211 and the main bus 12.

Further, the controller 19 may be configured to compare the voltage of the output terminal of the fuel cell 11 to a preset voltage $V_1$, and determine whether the voltage of the output terminal of the fuel cell 11 is less than the preset voltage $V_1$, at step S209. At step S209, the controller 19 may be configured to receive the magnitude information of the voltage of the output terminal of the fuel cell 11 from the voltage sensor 31 configured to sense the voltage of the fuel cell 11, and compare the voltage of the output terminal of the fuel cell 11 to the preset voltage $V_1$. The preset voltage $V_1$ may be set to a low voltage value at which the fuel cell 11 is not deteriorated when the operation of the fuel cell 11 is stopped.

The process of controlling the first switching unit 13 to be opened and operating the second switching unit 17 to be shorted may be continuously maintained until the voltage of the output terminal of the fuel cell 11 decreases to be less than the preset voltage $V_1$. Then, in response to determining at step S209 that the voltage of the output terminal of the fuel cell 11 is less than the preset voltage $V_1$, the controller 19 may be configured to operate the first and second switching units 13 and 17 to be shorted at step S211. Through the control of step S211, the main bus 12 may be electrically connected to the load device 15. Through the electrical connection state, the remaining power of the main bus 12 may be consumed by the load device 15, and the voltage of the main bus 12 may be decreased.

In addition, the controller 19 may be configured to compare the voltage of the main bus 12 to a preset voltage $V_2$, and determine whether the voltage of the main bus 12 is less than the preset voltage $V_2$, at step S213. At step S213, the controller 19 may be configured to receive the magnitude information of the voltage of the main bus 12 from the voltage sensor 33 configured to sense the voltage of the main bus 12, and compare the voltage of the main bus 12 to the preset voltage $V_2$. The voltage $V_2$ may be preset to a low voltage value at which safety may be secured even when the voltage of the main bus 12 is exposed to the human body or the like. The process of controlling the first and second switching units 13 and 17 to be shorted may be continuously maintained until the voltage of the main bus 12 decreases to be less than the preset voltage $V_2$. Then, when the voltage of the main bus 12 decreases to be less than the preset voltage $V_2$, the controller 19 may be configured to operate the first and second switching units 13 and 17 to be opened, thereby blocking the electrical connection between the fuel cell 11 and the main bus 12 and the electrical connection between the fuel cell 11 and the load device 15, at step S215.

Accordingly, when a risk even such as collision occurs, the method for controlling the power net system of the fuel cell vehicle according to the exemplary embodiment of the present disclosure may decrease the voltage of the output terminal of the fuel cell 11 to a safe range, and electrically connect the main bus 12 to the load device 15 to reduce the voltage of the main bus 12, thereby removing a risk caused by the exposure of the main bus 12. Compared to the control method of FIG. 2, the control method of FIG. 3 may sequentially remove the voltage of the output terminal of the fuel cell 11 and the voltage of the main bus 12. The control method of FIG. 2 may be applied when the power of the output terminal of the fuel cell 11 and the power of the main bus 12 are difficult to consume since the capacity of the load device 15 may not be sufficient.

Figure 4:
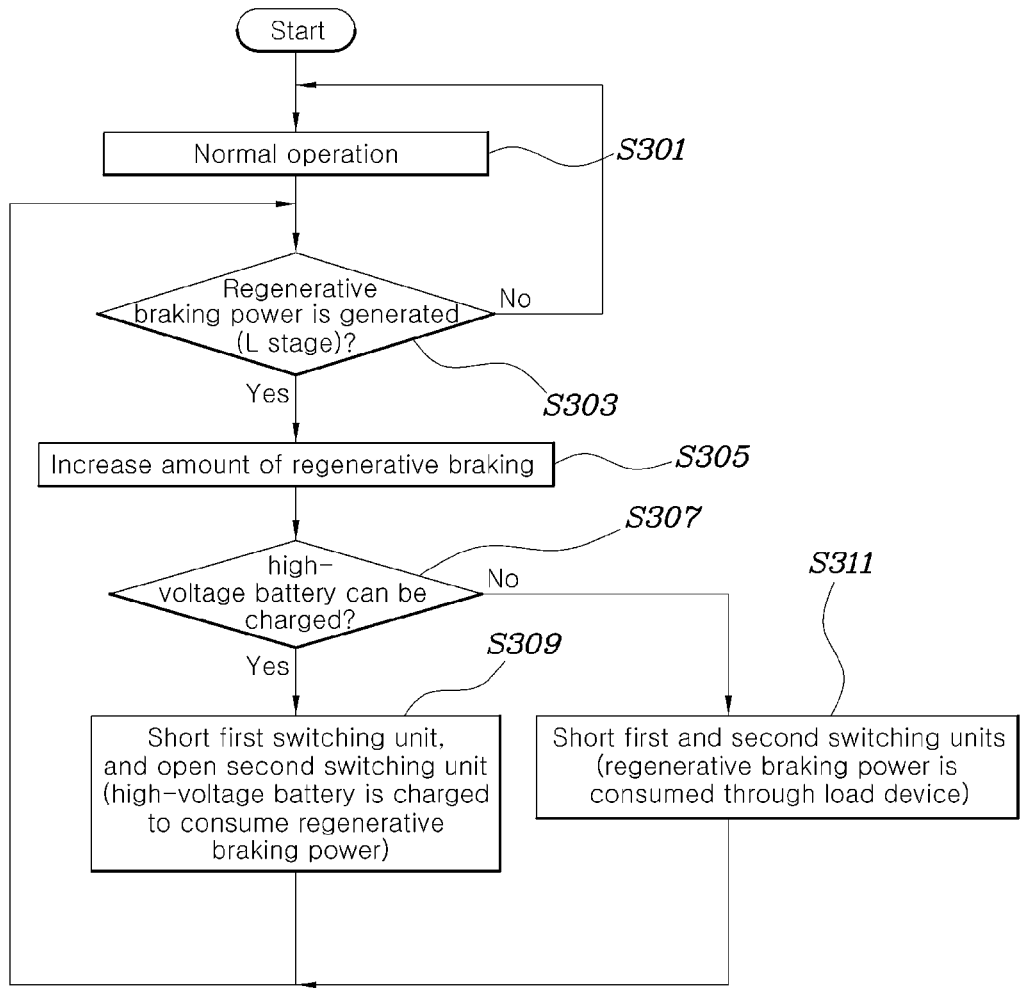

FIG. 4 is a flowchart illustrating another example of the method for controlling the power net system of the fuel cell vehicle according to the exemplary embodiment of the present disclosure. In particular, FIG. 4 illustrates an example which may be applied when regenerative braking power is generated by the driving motor unit 23 through continuous regenerative braking. Referring to FIG. 4, when regenerative braking power is generated at step S303 while the fuel cell vehicle having the power net system according to the exemplary embodiment of the present disclosure is operated normally at step S301, the controller 19 may be configured to determine whether the high-voltage battery 211 may be charged at step S307, while increasing the amount of regenerative braking at step S305.

At step S303 of determining whether regenerative braking power is generated, the controller 19 may be configured to determine whether the transmission is set to the L stage to maintain a continuous feeling caused by the driving motor when hydraulic braking is not used. In other words, when the vehicle transmission is set to the L stage, the controller 19 may be configured to receive a signal indicating that the transmission is set to the L stage, and thus determine that regenerative braking is performed. At step S307, the controller 19 may be configured to receive information regarding whether the high-voltage converter 212 or the high-voltage battery 211 of the high-voltage battery unit 21 broke down (e.g., error or failure), or whether the state of charge (SOC) of the high-voltage battery is excessively high, to determine whether the high-voltage battery may be charged.

Then, in response to determining that the high-voltage battery may be charged, the controller 19 may be configured to operate the first switching unit 13 to be shorted, and operate the second switching unit 17 to be opened, at step S309. Then, the high-voltage battery 211 may be charged to consume the regenerative braking power. In particular, the controller 19 may be configured to set the maximum value of regenerative braking as much as the chargeable capacity of the high-voltage battery.

Further, in response to determining that the high-voltage battery may not be charged, the controller 19 may be configured to operate the first and second switching units 13 and 17 to be shorted at step S311. Through the operation of the controller 19, the main bus 12 and the load device 15 may be electrically connected to each other, and the regenerative braking power input to the main bus 12 from the driving motor unit 23 may be consumed by the load device 15. Particularly, the controller 19 may be configured to set the maximum value of regenerative braking as much as the capacity of the load device. When the regenerative braking power is consumed by the load device 15, the voltage of the main bus 12 may be maintained at a value that corresponds to an open circuit voltage (OCV) of the fuel cell 11 to prevent the occurrence of the output of the fuel cell 11. In other words, the controller 19 may be configured to operate the high-voltage converter 213 of the high-voltage battery unit 21 to correspond the output thereof to the OCV of the fuel cell 11.

Accordingly, when regenerative braking power is input by the driving motor 23, the method for controlling the power net system of the fuel cell vehicle according to the exemplary embodiment of the present disclosure may consume the regenerative braking power using the load device 15 for removing the voltage of the fuel cell 11, even though the high-voltage battery unit 21 may not be charged. Thus, the control method may secure the time during which regenerative braking is applied, thereby continuously providing a proper braking feeling to a driver. Furthermore, the control method may prevent an accident such as hydraulic brake failure.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A power net system of a fuel cell vehicle, comprising:
   a fuel cell;
   a first switching unit configured to form and block an electrical connection between an output terminal of the fuel cell and a main bus;
   a load device diverging and connected between the output terminal of the fuel cell and the first switching unit;
   a reverse current blocking unit disposed between the output terminal of the fuel cell and a node from which the load device diverges, and configured to block a current flow to the output terminal of the fuel cell;
   a second switching unit configured to form and block an electrical connection between the output terminal of the fuel cell and the load device; and
   a controller configured to operate the first and second switching units to form electrical connection between the main bus and the load device to cause power of the main bus to be consumed by the load device, when a preset event occurs.

2. The power net system according to claim 1, wherein when the preset event occurs, the controller is configured to operate the first and second switching units to be shorted, until the voltage of the main bus decreases to be less than a preset voltage.

3. The power net system according to claim 1, wherein when the preset event occurs, the controller is configured to operate the first switching unit to be opened and operate the second switching unit to be shorted, until the voltage of the output terminal of the fuel cell decreases to be less than a preset voltage, and
   when the voltage of the output terminal of the fuel cell decreases to be less than the preset voltage, the controller is configured to operate the first and second switching units to be shorted, until the voltage of the main bus decreases to be than the preset voltage.

4. The power net system according to claim 1, further comprising a high-voltage battery unit connected in parallel to the fuel cell via the main bus.

5. The power net system according to claim 4, wherein when the preset event occurs, the controller is configured to block the electrical connection between the high-voltage battery unit and the main bus, and operate the first and second switching units to be shorted, until the voltage of the main bus decreases to be less than a preset voltage.

6. The power net system according to claim 4, wherein when the preset event occurs, the controller is configured to block the electrical connection between the high-voltage battery unit and the main bus, and operate the first switching unit to be opened and operate the second switching unit to be shorted, until the voltage of the output terminal of the fuel cell decreases to be less than a preset voltage, and
   when the voltage of the output terminal of the fuel cell decreases to be less than the preset voltage, the controller is configured operate the first and second switching units to be shorted, until the voltage of the main bus decreases to be less than the preset voltage.

7. The power net system according to claim 4, further comprising:
   a driving motor unit connected to the main bus,
   wherein when regenerative braking power is generated by the driving motor unit, the controller is configured to detect whether the high-voltage battery unit can be charged, and
   when the high-voltage battery unit cannot be charged, the controller is configured to operate the first and second switching units to be shorted, to cause the regenerative braking power to be consumed by the load device.

8. The power net system according to claim 7, wherein the controller is configured to adjust an output voltage of a high-voltage converter in the high-voltage battery unit to adjust the voltage of the main bus to have a value that corresponds to an open state voltage of the fuel cell.

9. The power net system according to any one of claim 1, wherein when the preset event occurs, the controller is configured to block the supply of hydrogen and oxygen to the fuel cell, before operating the first and second switching units.

10. The power net system according to claim 1, further comprising:
    a driving motor unit connected to the main bus,
    wherein when regenerative braking power is generated by the driving motor unit, the controller is configured to operate the first and second switching units to be shorted, to cause the regenerative braking power to be consumed by the load device.

11. A method for controlling a power net system of a fuel cell vehicle, comprising:
    wherein when a preset event occurs, operating, by a controller, a first switching unit for forming and blocking an electrical connection between an output terminal of a fuel cell and a main bus, a second switching unit for forming and blocking an electrical connection between the output terminal of the fuel cell, and a load device diverging and connected between the output terminal of the fuel cell and the first switching unit; and
    forming, by the controller, the electrical connection between the main bus and the load device to cause power of the main bus to be consumed by the load device.

12. The method according to claim 11, further comprising:
    operating, by the controller, the first and second switching units to be shorted, when the preset event occurs;
    comparing, by the controller, the voltage of the main bus to a preset voltage; and
    operating, by the controller, the first and second switching units to be opened, when the voltage of the main bus decreases to be less than the preset voltage.

13. The method according to claim 12, further comprising:
    blocking, by the controller, the supply of hydrogen and oxygen to the fuel cell before blocking the electrical connection between the main bus and a high-voltage battery unit, when the preset event occurs.

14. The method according to claim 11, further comprising:
    blocking, by the controller, the electrical connection between the main bus and a high-voltage battery unit connected in parallel to the fuel cell via the main bus and operating the first and second switching units to be shorted, when the preset event occurs;

comparing, by the controller, the voltage of the main bus to a preset voltage; and operating, by the controller, the first and second switching units to be opened when the voltage of the main bus decreases to be less than the preset voltage.

15. The method according to claim 11, further comprising:

blocking, by the controller, the electrical connection between the main bus and a high-voltage battery unit connected in parallel to the fuel cell via the main bus, and operating the first switching unit to be opened and operating the second switching unit to be shorted, when the preset event occurs;

comparing, by the controller, the voltage of the output terminal of the fuel cell to a preset first voltage;

operating, by the controller, the first and second switching units to be shorted, when the voltage of the output terminal of the fuel cell decreases to be less than the first voltage;

comparing, by the controller, the voltage of the main bus to a preset second voltage; and operating, by the controller, the first and second switching units to be opened, when the voltage of the main bus decreases to be less than the second voltage.

16. The method according to claim 15, further comprising:

blocking, by the controller, the supply of hydrogen and oxygen to the fuel cell before blocking the electrical connection between the main bus and a high-voltage battery unit, when the preset event occurs.

17. The method according to claim 11, wherein when regenerative braking power is generated by a driving motor unit connected to the main bus, the method further includes:

operating, by the controller, the first and second switching units to be shorted, to cause the regenerative braking power to be consumed by the load device.

18. The method according to claim 11, further comprising:

detecting, by the controller, whether a high-voltage battery unit connected in parallel to the fuel cell via the main bus can be charged, when regenerative braking power is generated by a driving motor unit connected to the main bus; and operating, by the controller, the first and second switching units to be shorted, to cause the regenerative braking power to be consumed by the load device, when the high-voltage battery unit cannot be charged.

19. The method according to claim 18, further comprising:

adjusting, by the controller, an output voltage of a high-voltage converter in the high-voltage battery unit to adjust the voltage of the main bus to have a value that corresponds to an open state voltage of the fuel cell.

20. The method according to claim 11, further comprising:

operating, by the controller, the first switching unit to be opened and operating the second switching unit to be shorted, when the preset event occurs;

comparing, by the controller, the voltage of the output terminal of the fuel cell to a preset first voltage;

operating, by the controller, the first and second switching units to be shorted when the voltage of the output terminal of the fuel cell decreases to be less than the first voltage;

comparing, by the controller, the voltage of the main bus to a preset second voltage; and operating, by the controller, the first and second switching units to be opened, when the voltage of the main bus decreases to be less than the second voltage.

* * * * *